Patented Sept. 15, 1936

2,054,392

UNITED STATES PATENT OFFICE 2,054,392

ART OF PREVENTING DECAY

Jagan N. Sharma, Riverside, Calif., assignor to Food Machinery Corporation, San Jose, Calif., a corporation of Delaware No Drawing. Application October 21, 1935, Serial No. 45,965

10 Claims. (Cl. 99—156)

This invention relates to methods and means particularly adapted to the treatment of fruits and vegetables for the purpose of immunizing and protecting the same from decay. The invention is particularly directed to the treatment of citrus fruit for the purpose of preventing decay by reason of the growth and development of molds.

The fruit-growing industries have been faced for years with the problem of maintaining the fruit in a palatable condition during the protracted shipping and storage periods. Citrus fruits are particularly susceptible to attack and decay caused by molds of the penicillium and aspergillus types, these molds being generally referred to as blue and green molds. The decay losses, due to the destructive effect of such molds, may amount to as much as 10% or 15% of the entire crop shipped to market. In an attempt to reduce such loss by decay, the growers and packers have treated the fruit with various solutions, such as solutions containing borax and sodium hypochlorite but none of the previously suggested treating agents have protected or immunized the fruit from subsequent inoculation with the spores of the molds. In addition, the use of the previously known and suggested substances or mold-retarding agents has involved careful control of the treating operation and a considerable expenditure for equipment, time and labor.

It is to be remembered that in the customary method of handling citrus fruit, the fruit is first introduced into a soaking tank containing soap, a light oil emulsion, or other cleansing agent adapted to loosen and soften the adhering impurities. The fruit is then passed over brushes in a washer for the purpose of removing the dirt, soot, scale and other impurities. Often the fruit are rinsed before being discharged from the washer. After the washing and rinsing operation, the fruit are passed into a treating tank in which they are maintained in contact with a treating solution (generally at an elevated temperature) for an appreciable length of time. Thereafter the fruit are rinsed for the removal of adhering treating solution and then dried, colored, waxed, polished, etc. The use of borax in the treating tanks was extensively advocated at one time but it was found that it was necessary to use a 6% borax solution at a temperature of about 120° F. and maintain contact between such solution and the fruit for a period of five minutes before a fairly satisfactory retardation of mold growth could be expected (see General Agricultural Research, U. S. D. A. vol. 30, page 189, 1925).

Such prolonged contact at an elevated temperature injures the fruit in that the essential oils and waxes present in the peel are driven out and the fruit shrinks and withers very rapidly thereafter. Moreover, it is necessary to rinse the fruit after such treatment as otherwise the fruit becomes covered with a white deposit of borax which impairs the sales value of the fruit. Sodium hypochlorite, on the other hand, is relatively volatile and attacks the bristles of the brushes with which the fruit subsequently come in contact.

It is apparent, therefore, that the treating agents of the prior art not only incompletely protected the fruit from the ravages of mold and decay but in addition involved numerous operating and handling difficulties. The present invention is directed toward a treating agent which not only kills and destroys molds and spores thereof existing on the fruit at the time of treatment but in addition protects or immunizes the fruit against decay due to subsequent inoculation. Moreover, the present method and agent exert remarkable protecting and immunizing effect upon the fruit without burning or injuring the delicate oil-containing peel or skin, thereby permitting the fruit to retain its natural, fresh appearance.

This invention is based upon the discovery of means whereby certain diphenyls, such as the hydroxy diphenyls, may be commercially and safely used in the treatment of fruits and vegetables for the purpose of protecting the fruit from decay caused by molds and fungi, without burning, withering or otherwise impairing the fruit.

More particularly, the invention is based upon the discovery that the water-soluble salts of diphenyls, such as the water-soluble ortho or para phenylphenols may be utilized as treating agents provided hydrolysis-depressing agents are used in conjunction therewith. Under the conditions and with the ingredients hereinafter described, molds and fungi originally present on the fruit being treated are destroyed and the fruit protected from decay due to subsequent contact with the spores of fungi and molds.

Moreover, considerable latitude in conditions of temperature, time and concentration during treatment may exist, thereby permitting the treatment to be carried out commercially in an effective manner with the minimum amount of control and expense.

It is an object of this invention, therefore, to disclose and provide a method of treating fruit and vegetables for the purpose of protecting the same from the ravages of mold and fungi.

Another object of the invention is to disclose and provide a treating agent capable of destroying existing molds and fungi and protecting the treated fruit from further decay.

A further object of the invention is to disclose and provide, as an article of commerce, a composition adapted for use in the treatment of fruits and vegetables.

These and other objects, uses, advantages and modifications of the invention will become apparent to those skilled in the art from the following detailed description of means and methods of adapting the invention for use in the citrus industry, it being understood that the invention is not limited to its use in this industry alone.

The salts or substances used in the process of this invention are salts of hydroxy diphenyl, which is a substance practically insoluble in water. Although hydroxy diphenyls have a deadly effect upon molds, fungi and other spores, they also cause burning of the skin or peel of fruit. When citrus fruit are brought in contact with a treating solution containing as little as 0.05% of hydroxy diphenyl, it is found that the peel becomes dark, hard, drawn and leathery, these being evidences of what is termed "burning".

Water-soluble salts of hydroxy biphenyls such as salts of one of the alkaline metals (sodium, potassium, ammonium, lithium, magnesium, for example) also exert a desired decay-inhibiting effect upon fruit. Solutions of these salts, however, have a tendency to hydrolyze, liberating the hydroxy diphenyl. I have found that by using a hydrolysis-depressing agent comprising or including a free alkali such as sodium hydroxide or potassium hydroxide, the treating solution containing such water-soluble salts is stabilized and is capable of being used in the treatment of fruits and vegetables for the purposes of this invention without burning, withering, or otherwise impairing the fruit. Moreover, it is not necessary that the treating solution of this invention be heated (except for purpose of facilitating solution, as in the case of calcium phenylphenate) or that the time of contact between the fruit and the treating solution exceeds about 3 minutes.

Moreover, it is not necessary that fruit treated with the solution of this invention be rinsed after treatment and instead the fruit may be permitted to dry and be handled thereafter in the customary manner. Sodium hydroxy diphenyl (also known as sodium ortho phenylphenate or sodium para phenylphenate) is an illustrative water-soluble salt of the character embraced by this invention. When sodium ortho phenylphenate is used, the treating solution may contain from about 0.01% or 0.02% to about 0.5% by weight of such salt and from about 0.02% to 0.15% of sodium hydroxide or its equivalent. Ordinarily, from about 0.01% to 0.2% of water-soluble phenylphenate by weight of the water should be employed. The time of contact between the treating solution and the citrus fruit, even at ordinary temperatures, need not exceed 2 or 3 minutes. Times of contact from 1 to 5 minutes may be used, depending somewhat upon the content of phenylphenate in the treating solution. The temperatures of the bath may range from atmospheric (70° F.) to 110° F. without materially influencing the results obtained. The pH of the treating bath should be between slightly over 7 and that pH which is produced by the use of about 0.15% of sodium hydroxide.

Although free alkali appears essential in the treating solution in order to prevent the formation of hydroxy diphenyl and specific reference has been made to caustic soda or caustic potash, it is to be understood that substances containing free alkali may be used, such as, for example, certain forms of sodium silicate and soaps containing free alkali. Ordinary soaps do not contain free alkali. Such soaps may be used in addition to a free alkali and when soap is also used, the treating solution may contain from about 0.2% to 1.5% of soap.

A typical solution may contain 0.2% of sodium ortho phenylphenate and 0.1% of sodium hydroxide. Another typical solution contained 0.2% of sodium ortho phenylphenate, 0.2% of soap and 0.025% of sodium hydroxide.

By the use of alkali as a hydrolysis-depressing agent, a great latitude is given to the operator. Variation in content of water-soluble phenylphenate salt may occur over a wider range without the possibility of injuring or burning the fruit or improperly inhibiting decay thereof. The time of contact may vary appreciably and the temperature may rise and fall without influencing the results materially. When the hydrolysis-depressing substances are not used, the solution of the water-soluble diphenyl salt readily breaks down with the liberation of the heavy diphenyl hydrate, thereby burning the fruit.

During an extended treating period, some of the free alkali in the solution may be converted to carbonate by reason of contact with air. For this reason it is often necessary to add additional free alkali to the bath to maintain the desired free alkali content.

In order to facilitate the preparation of suitable treating solutions, a suitable mixture of a water-soluble, hydroxy diphenyl salt, an alkali and soap, may be compounded so that a given weight of the mixture may be added to the water in the treating tanks. Such product may consist of either mechanical mixture of the ingredients or the salt and the alkaline substance may be homogeneously and intimately combined. For example, diphenyl hydrate may be mixed with oleic or other fatty acid and the mixture then treated with an excess of caustic soda so that the hydroxy diphenyl is occluded by the soap during saponification of the acid. Such mixture may well be made by taking 2 parts of hydroxy diphenyl, 7 parts of oleic acid and 2 parts of sodium hydroxide. Instead of the above mixture, a suitable preparation can be made by taking about 2 parts of hydroxy diphenyl, 7 parts of oleic acid, slightly more than 1 part of sodium hydroxide, and 2 parts by weight of sodium alcoholate. The alcohol liberated during the reaction may be recovered.

The base products may contain from 0.3 to 3 times as much soap as of the water-soluble salt of hydroxy diphenyl. From 1% to 10% of a composition may consist of sodium hydroxide or equivalent alkali.

The use of the base mixtures described hereinabove greatly facilitates the preparation of the treating solution. For example, it is only necessary to add 5 pounds of a composition containing 33% of a soluble alkaline hydroxy diphenyl salt and the balance of soap and alkali to a 100 gallon tank of water in order to produce a suitable treating solution which would contain about 0.2% of the hydroxy diphenyl salt by weight of the water with a suitable proportion (about 0.4% by weight) of soap and alkali.

The soap and alkali present in the treating baths described hereinabove not only function in the manner stated (as a hydrolysis-depressing agent) but also lower the surface tension of the bath and facilitate thorough wetting of the fruit and spores or mold carried thereby to the effect that the polyphenol is brought into intimate contact with the entire surface of the fruit and of the molds carried thereby.

Attention is called to the fact that mold growth can only originate in cut, bruised or punctured portions of the skin. When such scarred fruit are subjected to the action of treating agents previously known and then later reinoculated or exposed to the spores of molds, the mold growth will develop and decay will take place in areas adjoining such scars or punctures. The treating agents of this invention, however, are believed to be retained within the skin adjacent the punctures, scars or bruises, so that the treated fruit are substantially immune to subsequent inoculation or exposure to spores of the various molds which are present in great numbers not only in the boxes, crates or other equipment with which the fruit comes in contact, but also even in the atmosphere.

It has been found that the dilute treating solutions of this invention not only kill all mold and spores originally present on the fruit, but in addition the fruit is protected from subsequent inoculation. For example, oranges after having been washed in the usual manner, were scarred by purposely cutting the skin. The scarred fruit was then dipped into an inoculating bath filled with the spores and mold of the penicillium type so that the mold and spires thoroughly wetted the scarred tissue of the fruit as well as the entire surface. The inoculated fruit was permitted to stand in the open air for about one hour and then subjected to a three minute contact with a treating solution containing 0.1% sodium hydroxy diphenyl, (sodium-ortho-phenylphenate) said solution being at a temperature of about 72° F. A portion of the fruit thus treated was then stored for a period of three weeks in an incubator maintained at a temperature of 95° F. and a humidity of 85%. At the end of that time the fruit showed no signs of decay or mold growth even though the incubator contained, during the period of test, other lots of fruit which were badly infested with molds. The scars made on the treated fruit had completely healed over.

The remaining portion of the fruit which had been scarred, inoculated with mold spores, and then treated with the sodium hydroxy diphenyl solution, was permitted to stand in the open air for a period of an hour or more and then again dipped in the inoculating bath containing the molds and spores. The fruit thus inoculated for the second time were placed in the incubator (without further treatment with the diphenyl solution) and at the expiration of two weeks the fruit showed no decay.

Comparative tests carried out under identical conditions in which 6% borax solutions and 0.6% sodium hypochlorite solutions were used resulted in fruit which were completely destroyed by the ravages of mold. The fruit subjected to a single inoculation were destroyed just as completely as the fruit which were subsequently inoculated. It is to be remembered that in these check tests the fruit are contacted with the borax solution for a period of five minutes and that the solution was maintained at a temperature of 110° F. whereas the hypochlorite solution, although maintained at atmospheric temperatures, was permitted to stay in contact with the fruit for a full five minutes.

The treating solution of this invention also exerts a surprising effect on stem end rot, which is an extremely virulent form of decay. Whereas untreated oranges showed from about 20% to 35% of decay due to stem end rot at the end of 14 days, oranges which had been treated with a solution containing 0.5% of sodium phenylphenate and 0.3% of free caustic soda showed only 1%–2% of decay at the end of the same period of time.

The means and methods of this invention are of inestimable value to the fruit packing industry as the results attained definitely show that citrus fruit treated in accordance with this invention are highly resistant and virtually immune to further inoculation with spores, molds and other forms of decay over protracted periods of time.

This application is a continuation in part of a co-pending application Serial No. 747,424, filed October 8, 1934.

I claim:

1. A method of protecting whole fruit and vegetables from decay, comprising the step of contacting fruit with an aqueous solution containing a water-soluble salt of hydroxy diphenyl, and an alkali in quantity capable of depressing hydrolysis of said diphenyl but incapable of burning the fruit upon contact.

2. In a fruit treating process, the step of inhibiting decay of fruit due to molds, fungi, spores and other decay, which comprises: contacting whole fruit with an aqueous medium containing from about 0.02% to about 0.5% by weight of a water-soluble salt of phenylphenol and also containing a hydrolysis-depressing agent including free alkali, said hydrolysis-depressing agent being present in quantity sufficient to introduce from about 0.01% to about 0.15% of free alkali into the aqueous medium, and maintaining such contact for a time sufficient to inhibit decay of said fruit without causing burning.

3. In a fruit treating process, the step of inhibiting decay of fruit due to molds, fungi, spores and other decay, which comprises: contacting whole fruit with an aqueous medium containing from about 0.02% to about 0.5% by weight of sodium phenylphenate and also containing a hydrolysis-depressing agent including free alkali, said hydrolysis-depressing agent being present in quantity sufficient to introduce from about 0.01% to about 0.15% of free alkali into the aqueous medium, and maintaining such contact for a time sufficient to inhibit decay of said fruit without causing burning.

4. A method of protecting whole fruit and vegetables from decay without injuring or burning the fruit, which comprises subjecting fruit to the action of an aqueous solution containing from about 0.02% to about 0.5% by weight of a water-soluble salt of phenylphenol, and also containing from about 0.01% to about 0.15% of sodium hydroxide, whereby the decay of fruit is inhibited without injuring or burning the fruit.

5. A method of protecting whole fruit and vegetables from decay without injuring or burning the fruit, which comprises subjecting fruit to the action of an aqueous solution containing from about 0.02% to about 0.5% by weight of a water-soluble salt of phenylphenol, and also containing from about 0.01% to about 0.15% of sodium hydroxide, for a period of time not exceeding about 5 minutes and at substantially atmospheric temperatures, whereby the decay of fruit is inhibited without injuring or burning the fruit.

6. An aqueous medium for treating citrus fruit comprising a water solution containing from about 0.02% to about 0.5% by weight of a water-soluble salt of phenylphenol and also containing from about 0.01% to about 0.15% of free alkali.

7. An aqueous medium for treating citrus fruit comprising a water solution containing from about 0.02% to about 0.5% by weight of a water-soluble salt of phenylphenol and also containing from about 0.01% to about 0.15% of sodium hydroxide.

8. An aqueous medium for treating fruit for the purpose of inhibiting decay thereof, comprising a water solution containing from about 0.02% to 0.5% by weight of sodium phenylphenate and also containing a hydrolysis-depressing agent including free alkali, said hydrolysis depressing agent being present in quantity sufficient to introduce from about 0.01% to about 0.15% of said free alkali into said solution.

9. As an article of manufacture, a base product capable of being dissolved in water to form an aqueous solution adapted for use in the treatment of fruits and vegetables, comprising soap, a water-soluble salt of phenylphenol, and alkali, said product containing alkali in quantity sufficient to prevent the burning of fruit when said product is dissolved in water to form a solution containing from about 0.02% to about 0.5% of said salt of phenylphenol.

10. As an article of manufacture, a base product capable of being dissolved in water to form an aqueous solution adapted for use in the treatment of fruits and vegetables, comprising soap, a water-soluble salt of phenylphenol, and alkali, said product containing from 0.3 to 3 times as much soap as of said water-soluble salt, and containing said alkali in quantity sufficient to prevent the burning of fruit when said product is dissolved in water to form a solution containing from about 0.02% to about 0.5% of said salt of phenylphenol.

JAGAN N. SHARMA.

CERTIFICATE OF CORRECTION.

Patent No. 2,054,392.

September 15, 1936.

JAGAN N. SHARMA.

It is hereby certified that error appears in the printed specification of the above numbered patent requiring correction as follows: Page 2, first column, line 26, for "biphenyls" read diphenyls; page 3, second column, line 12, for "0.3%" read 0.03%; and that the said Letters Patent should be read with these corrections therein that the same may conform to the record of the case in the Patent Office.

Signed and sealed this 27th day of April, A. D. 1937.

(Seal)

Leslie Frazer
Acting Commissioner of Patents.